(12) United States Patent
Jung et al.

(10) Patent No.: US 8,836,873 B2
(45) Date of Patent: Sep. 16, 2014

(54) DISPLAY DEVICES AND METHODS OF MANUFACTURING THE SAME

(75) Inventors: Kyungho Jung, Yongin-si (KR); Sin-Doo Lee, Seoul (KR); Jun-Hee Na, Seoul (KR); Jinhwan Kim, Suwon-si (KR)

(73) Assignees: Samsung Display Co., Ltd. (KR); SNU R&DB Foundation (KR)

( * ) Notice: Subject to any disclaimer, the term of this patent is extended or adjusted under 35 U.S.C. 154(b) by 195 days.

(21) Appl. No.: 13/475,206

(22) Filed: May 18, 2012

(65) Prior Publication Data

US 2012/0293735 A1    Nov. 22, 2012

(30) Foreign Application Priority Data

May 18, 2011 (KR) .................. 10-2011-0046792
Jan. 5, 2012 (KR) .................. 10-2012-0001663

(51) Int. Cl.
| | | |
|---|---|---|
| *G02F 1/1335* | (2006.01) | |
| *H04N 13/04* | (2006.01) | |
| *G02B 27/22* | (2006.01) | |
| *G02B 3/00* | (2006.01) | |

(52) U.S. Cl.
CPC .......... *G02B 27/2214* (2013.01); *G02B 3/0031* (2013.01); *H04N 13/0452* (2013.01); *H04N 2213/001* (2013.01); *H04N 13/0404* (2013.01)
USPC ................. 349/15; 349/200; 349/33; 385/16; 359/626; 359/462

(58) Field of Classification Search
CPC .................................... A61B 1/32; G02F 1/29
USPC ............................................. 349/15, 200, 33
See application file for complete search history.

(56) References Cited

U.S. PATENT DOCUMENTS 5,493,427 A * 2/1996 Nomura et al. ................... 349/5
7,058,252 B2 * 6/2006 Woodgate et al. .............. 385/16

(Continued)

FOREIGN PATENT DOCUMENTS

| KR | 1020070001533 A | 1/2007 |
| KR | 1020080002164 A | 1/2008 |
| KR | 1020080043610 A | 5/2008 |

OTHER PUBLICATIONS

H Kong et al 25.3: Autostereoscopic 2D/3D Switching Display Using Electric-Field-Driven LC Lens (ELC Lens), SID 08 Digest, pp. 348-351, 2008.

(Continued)

*Primary Examiner* — Edward Glick
*Assistant Examiner* — Sang V Nguyen
(74) *Attorney, Agent, or Firm* — Cantor Colburn LLP (57) ABSTRACT

A display device includes a first substrate, a middle layer, a first liquid crystal layer, a second substrate, a pixel part and a second liquid crystal layer. A first common electrode is on the first substrate. The middle layer includes a lenticular array, and a control electrode on the lenticular array. The control electrode faces the first common electrode. The first liquid crystal layer is between the middle layer and the first substrate, and a second common electrode is on a back side of the middle layer. The pixel part includes a plurality of pixel electrodes on the second substrate and facing the second common electrode. The second liquid crystal layer is between the second common electrode and the pixel part.

19 Claims, 11 Drawing Sheets

(56) References Cited

U.S. PATENT DOCUMENTS

| | | | |
|---|---|---|---|
| 7,697,208 B2 * | 4/2010 | De Zwart et al. | 359/626 |
| 8,398,798 B2 * | 3/2013 | Zuidema | 156/145 |
| 2006/0050385 A1 * | 3/2006 | Uehara et al. | 359/465 |
| 2007/0296911 A1 * | 12/2007 | Hong | 349/200 |
| 2009/0262420 A1 * | 10/2009 | Yun et al. | 359/463 |
| 2010/0026920 A1 * | 2/2010 | Kim et al. | 349/15 |
| 2010/0195203 A1 * | 8/2010 | Zuidema et al. | 359/463 |
| 2011/0096251 A1 * | 4/2011 | Son et al. | 349/15 |
| 2011/0109824 A1 * | 5/2011 | Galstian | 349/33 |
| 2012/0069255 A1 * | 3/2012 | Takagi et al. | 349/15 |

OTHER PUBLICATIONS

H Ren et al, "Tunable-focus flat liquid crystal spherical lens", Applied Physics Letters, vol. 84, No. 23, pp. 4789-4791, Jun. 7, 2004.

* cited by examiner

DISPLAY DEVICES AND METHODS OF MANUFACTURING THE SAME

This application claims priority to Korean Patent Application No. 10-2011-0046792, filed on May 18, 2011 and Korean Patent Application No. 10-2012-0001663, filed on Jan. 5, 2012, and all the benefits accruing therefrom under 35 U.S.C. §119, the content of which in its entirety is herein incorporated by references.

BACKGROUND OF THE INVENTION

1. Field of the Invention

The invention relates to display devices and methods of manufacturing the same and, more particularly, to display devices displaying a two-dimensional image and a three-dimensional image and methods of manufacturing the same.

2. Description of the Related Art

A stereoscopic image display device separates a left-eye-image and a right-eye-image having binocular disparity from each other and shows the left-eye-image and the right-eye-image to a left-eye and a right-eye of an observer, respectively. The observer sees the left-eye-image and the right-eye-image through both the left and right eyes. The observer then experiences a three-dimensional ("3D") effect by mergence of the left-eye-image and the right-eye-image.

Binocular disparity methods use disparity images of the left and right-eyes to achieve a 3D effect. The binocular disparity methods are classified into a glasses type and a non-glasses type. Both the glasses type and the non-glasses type are used in many practical applications. The glasses type stereoscopic image display device alternately displays the left-eye-image and the right-eye-image and switches a polarization characteristic of the images incident to polarizing glasses to realize a stereoscopic image, for example, a 3D image.

According to the non-glasses type, a lenticular lens or a parallax barrier is spaced apart from a two-dimensional ("2D") image panel by a predetermined distance, so that image data different from each other may be recognized by the left eye and the right eye of the observer, respectively.

Particularly, in the stereoscopic image display device using the lenticular lens, the lenticular lens has a semi-cylinder shape, and left and right images are disposed on a focal surface of the lenticular lens which has a striped shape. The left and right images may be separated from each other due to the lenticular lens, so that the observer may see the stereoscopic image without the glasses.

BRIEF SUMMARY OF THE INVENTION

Exemplary embodiments of the invention provide display devices which have a structure capable of switching between a two-dimensional ("2D") operation mode displaying a 2D image and a three-dimensional ("3D") operation mode displaying a 3D image and reduces a total thickness Exemplary embodiments of the invention also provide methods of manufacturing the display devices.

In one or more exemplary embodiments, a display device includes: a middle layer including a lenticular array, and a control electrode on the lenticular array; a first substrate on a first side of the middle layer; a first common electrode on the first substrate and facing the control electrode; a first liquid crystal layer between the middle layer and the first substrate; a second substrate on a second side of the middle layer opposite to the first side, and facing the first substrate; a second common electrode on the second side of the middle layer; a pixel part on the second substrate and including a plurality of pixel electrodes facing the second common electrode; and a second liquid crystal layer between the second common electrode and the pixel part.

In one or more exemplary embodiments, a method of manufacturing a display device includes: forming a first substrate portion including a first common electrode on a first substrate and a first liquid crystal layer on the first common electrode; forming a middle layer including a lenticular array, and a control electrode disposed on the lenticular array; combining the middle layer with the first substrate portion, the control electrode facing the first common electrode; forming a second substrate portion including a pixel part including a plurality of pixel electrodes on a second substrate, a second liquid crystal layer on the pixel part and a second common electrode on the second liquid crystal layer; and combining the middle layer with the second substrate portion, the second common electrode facing the plurality of pixel electrodes.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A stereoscopic image display device may include a lenticular lens which is spaced apart from a two dimensional ("2D") image panel by a predetermined distance. An image panel of the stereoscopic image display device may also include more than one substrate upon which elements are disposed. However, when the lenticular lens and the 2D image panel are spaced apart from each other and the 2D image panel includes two substrates, an overall thickness of the stereoscopic image display device undesirably increases. Furthermore, in the stereoscopic image display device using the lenticular lens having a semi-cylinder shape, such as liquid crystal display device, a liquid crystal layer may be non-uniform due to the protruding shape of the lenticular lens.

Hereinafter, exemplary embodiments of the invention will be explained in detail with reference to the accompanying drawings.

Figure 1:
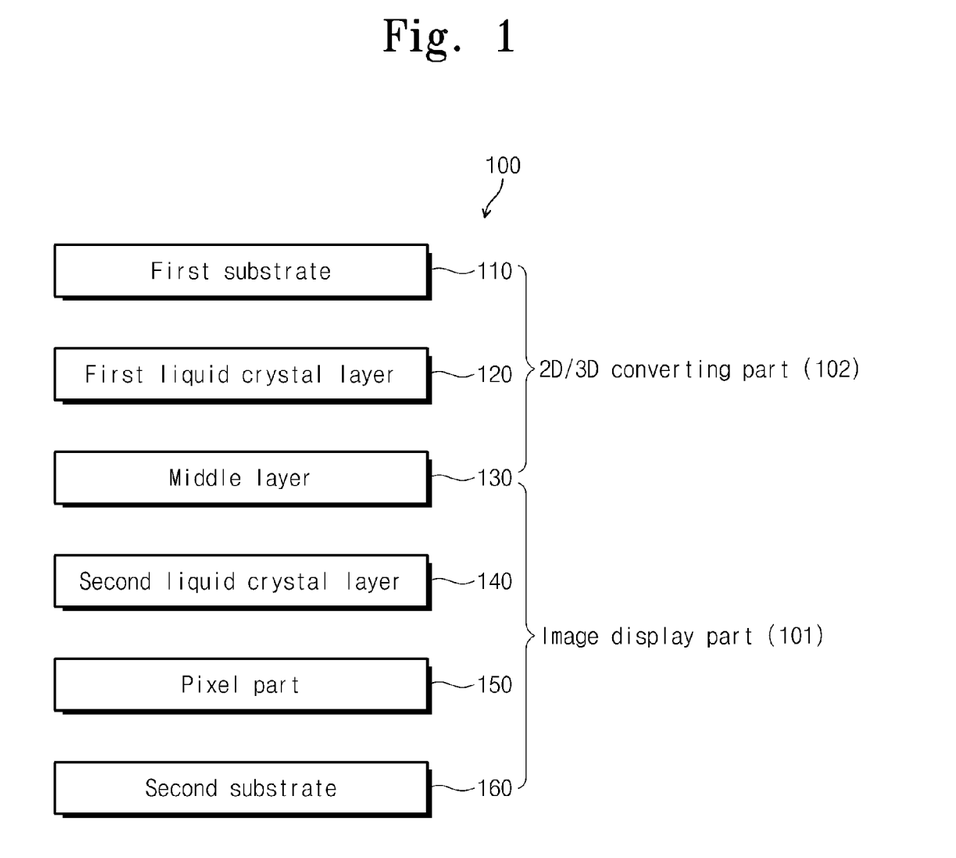
FIG. 1 is a schematic view showing an exemplary embodiment of a stacked structure of a display device according to the invention.
Figure 2:
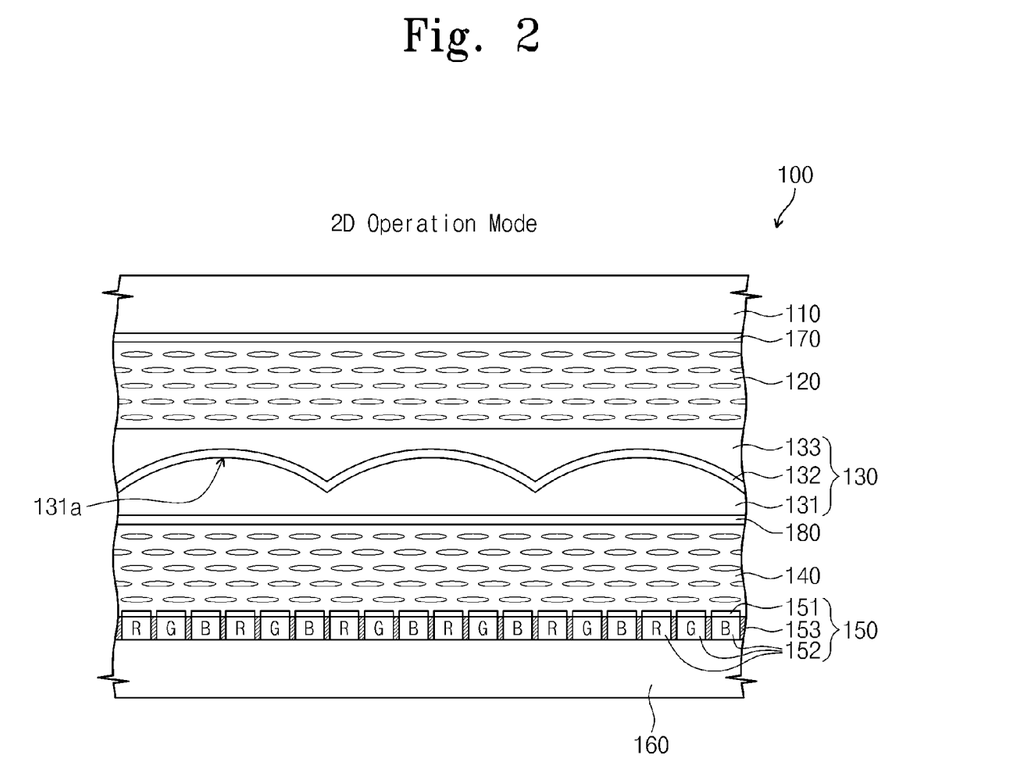
FIG. 2 is a cross-sectional view showing an exemplary embodiment of a two-dimensional ("2D") operation mode of the display device shown in FIG. 1.

FIG. 1 is a schematic view showing an exemplary embodiment of a stacked structure of a display device according to the invention and FIG. 2 is a cross-sectional view showing an exemplary embodiment of a 2D operation mode of the display device shown in FIG. 1.

Referring to FIG. 1, an exemplary embodiment of a display device 100 according to the invention includes a first substrate 110, a first liquid crystal layer 120, a middle layer 130, a second liquid crystal layer, 140, a pixel part 150 and a second substrate 160 in sequential order.

The first liquid crystal layer 120 is disposed between the first substrate 110 and the middle layer 130, and the second liquid crystal layer 140 is disposed between the middle layer 130 and the second substrate 160.

As shown in FIG. 2, the middle layer 130 includes a lenticular array 131 and a control electrode 132. The control electrode 132 is disposed on the lenticular array 131 and receives a driving voltage. The lenticular array 131 includes a plurality of convex lenses 131a. The convex lenses 131a are arranged in a first direction, that is, in the left-right direction in FIG. 2. The control electrode 132 is disposed along surfaces of the plurality of convex lenses 131a such as in a lengthwise direction of the convex lenses 131a, and has a substantially same cross-sectional profile defined by the convex lenses 131a. The convex lenses 131a have a longitudinal axis which extends in a second direction crossing the first direction, such as being substantially perpendicular to the first direction.

As shown in FIG. 2, the control electrode 132 may cover an entire surface of the lenticular array 131. However, the invention is not limited thereto. In other exemplary embodiments, a single individual control electrode 132 may be patterned to correspond to one or more of the convex lenses 131a, respectively. The control electrode patterns respectively corresponding to the convex lenses 131a may be connected to each other on a line-by-line basis or on a predetermined group-by-group basis. The control electrode patterns connected to the same line or included in the same group may receive driving voltages of the same voltage level. Alternatively, the control electrode patterns respectively connected to different lines or included in different groups may receive driving voltages of levels different from each other, respectively. In a single control electrode type arrangement where one control electrode pattern is disposed on one convex lens 131a in a one-to-one correspondence, the driving voltage may be applied to each of the convex lenses 131a individually.

The middle layer 130 further includes a planarization layer 133 disposed on the control electrode 132 and provides a substantially flat top surface of the middle layer 130. The planarization layer 133 includes the same material as the lenticular array 131. In one exemplary embodiment, for example, the planarization layer 133 and the lenticular array 131 may include an optical (e.g., light) curable polymer material such as acrylate resin. The control electrode 132 may include a transparent conductive material such as indium tin oxide ("ITO").

The display device 100 further includes a first common electrode 170 which is disposed directly on the first substrate 110 and faces the control electrode 132 with the first liquid crystal layer 120 therebetween. The first liquid crystal layer 120 includes a plurality of liquid crystal molecules. Arrangement directions of the liquid crystal molecules are controlled by a vertical electric field generated between the control electrode 132 and the first common electrode 170. That is, the vertical electric field is substantially perpendicular to the first common electrode 170.

The display device 100 further includes a second common electrode 180 disposed on a back side of the middle layer 130. The pixel part 150 is disposed directly on the second substrate 160 and includes a plurality of pixel electrodes 151 facing the second common electrode 180. The plurality of pixel electrodes 151 may be arranged in matrix form. Although not shown in the drawings, the pixel part 150 may further include gate lines extended in a row-direction in a plan view of the second substrate 160, data lines extended in a column-direction in the plan view of the second substrate 160, and a plurality of thin film transistors connected to the plurality of pixel electrodes 151 in one-to-one correspondence.

As shown in FIG. 2, the pixel part 150 further includes a color filter layer 152 including of a red color-pixel R, a green color-pixel G, and a blue color-pixel B. The plurality of pixel electrodes 151 are disposed directly on the color filter layer 152. Particularly, the plurality of pixel electrodes 151 may be disposed on the color-pixels R, G, and B in one-to-one correspondence. In an exemplary embodiment, the color filter layer 152 is disposed directly on a top surface of the second substrate 160. However, the invention is not limited thereto. In other exemplary embodiments, the color filter layer 152 may be disposed directly on a bottom surface of the middle layer 130 and/or a bottom surface of the first substrate 110. The pixel part 150 further includes a black matrix 153 disposed between two color-pixels adjacent to each other.

The second liquid crystal layer 140 includes a plurality of liquid crystal molecules and arrangement directions of the liquid crystal molecules are controlled by a vertical electric field generated between the second common electrode 180 and the plurality of pixel electrodes 151. That is, the vertical electric field is substantially perpendicular to the second common electrode 180.

Although not shown in the drawings, a backlight unit generating light may be disposed on a back side of the second substrate 160. The backlight unit includes a light source generating the light, and a light guide plate receiving the light from the light source and guiding the received light toward the second substrate 160. In an exemplary embodiments, the light source may include at least one light emitting diode disposed on at least one sidewall of the light guide plate.

As shown in FIG. 1, a lower side portion with respect to the middle layer 130 in the display device 100 may be defined as an image display part 101 and a upper side portion with respect to the middle layer 130 may be defined as a two-dimensional/three-dimensional ("2D/3D") converting part 102. The image display part 101 and the 2D/3D converting part 102 respectively include the base substrates 160 and 110. The image display part 101 and the 2D/3D converting part 102 may include a portion of the middle layer. The image display part 101 may control a light transmittance of the second liquid crystal layer 140 according to image data, thereby displaying a desired image. The 2D/3D converting part 102 may be turned-on or turned-off to convert the image output from the image display part 101 into a 2D image or a 3D image.

Here, an operation mode outputting the 2D image from the 2D/3D converting part 102 is defined as a 2D operation mode, and an operation mode outputting the 3D image from the 2D/3D converting part 102 is defined as a 3D operation mode.

In an exemplary embodiments, the first liquid crystal layer 120 may include a twisted nematic liquid crystal, and the twisted nematic liquid crystal may be a normally white mode liquid crystal. If the 2D/3D converting part 102 is turned-off in the 2D operation mode, the first liquid crystal layer 120 functions as a transparent layer to transmit the image output from the image display part 101. In order to turn-off the 2D/3D converting part 102, voltages may not be applied to the control electrode 132 and the first common electrode 170 or the same voltage may be applied to the control electrode 132 and the first common electrode 170.

As described above, in the 2D operation mode, the 2D/3D converting part 102 transmits the image output from the image display part 101, thereby displaying the 2D image.

Particularly, the first liquid crystal layer 120 may have a uniform thickness in the 2D/3D converting part 102 due to the planarization layer 133 of the middle layer 130. The light transmittance of the first liquid crystal layer 120 may be changed according to the thickness thereof As described above, since the first liquid crystal layer 120 has the uniform thickness due to the planarization layer 133, it is possible to reduce or effectively prevent deterioration of the quality of the 2D image.

Although not shown in FIG. 2, the display device 100 may further include a first spacer and a second spacer. The first spacer may be disposed between the first substrate 110 and the middle layer 130 in order to form a space between the first substrate 110 and the middle layer 130. The second spacer may be disposed between the second substrate 160 and the middle layer 130 in order to form a space between the second substrate 160 and the middle layer 130.

Figure 3:
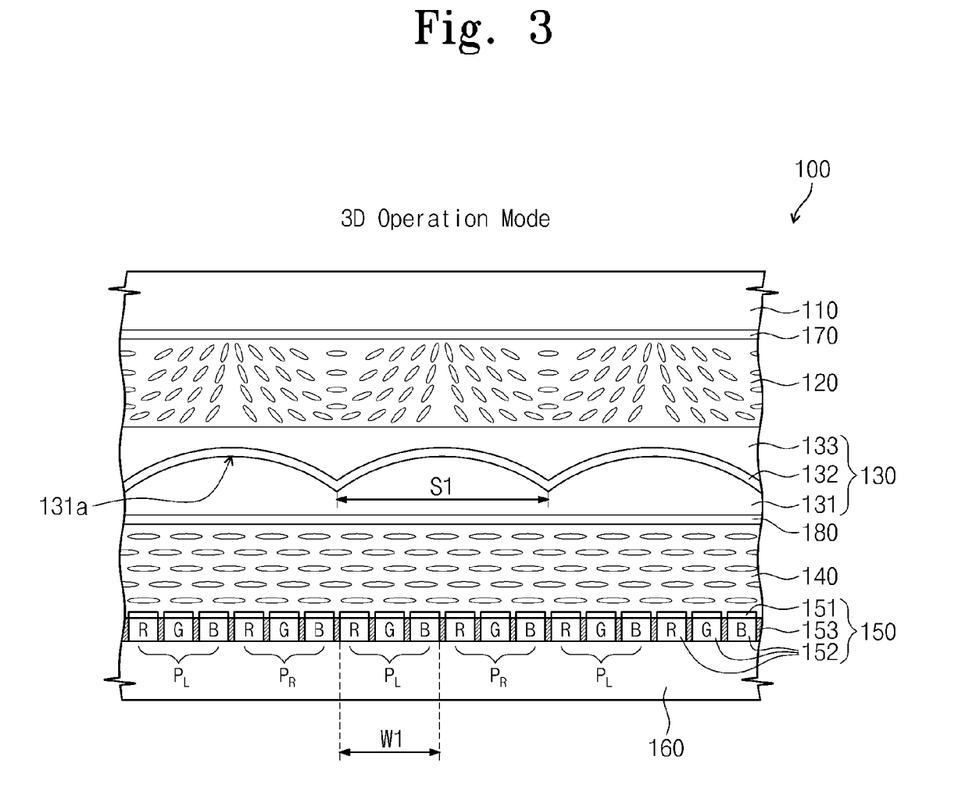
FIG. 3 is a cross-sectional view showing an exemplary embodiment of a three-dimensional ("3D") operation mode of the display device shown in FIG. 1.
Figure 4:
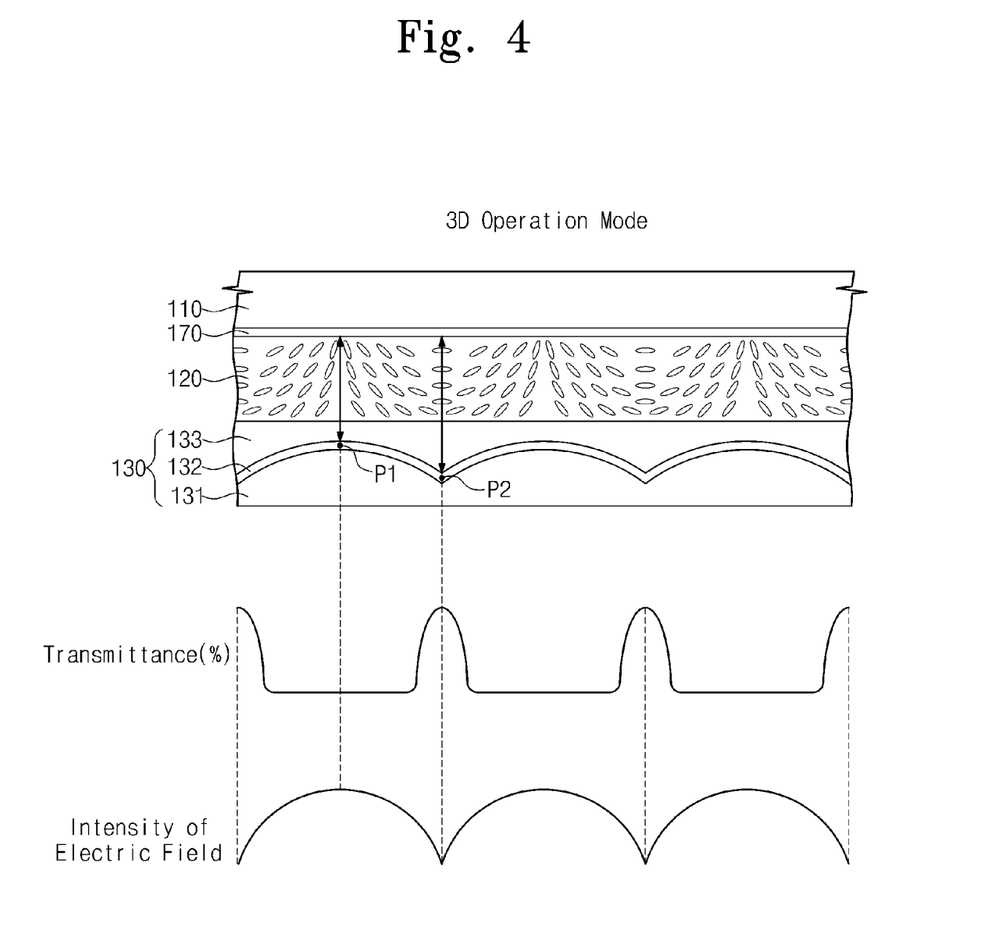
FIG. 4 shows a transmittance and an intensity of an electric field in a 2D/3D converting part shown in FIG. 3.

FIG. 3 is a cross-sectional view showing an exemplary embodiment of a 3D operation mode of the display device shown in FIG. 1, and FIG. 4 shows a transmittance and an intensity of an electric field in a 2D/3D converting part shown in FIG. 3.

Referring to FIG. 3, if the 2D/3D converting part 102 is turned-on in the 3D operation mode, the first liquid crystal layer 120 functions as a convex lens. Thus, the image output from the image display part 101 may be converted into the 3D image after passing through the first liquid crystal layer 120.

In more detail, a reference voltage is applied to the first common electrode 170 and the driving voltage is applied to the control electrode 132. Thus, a vertical electric field is generated between the first common electrode 170 and the control electrode 132. In an exemplary embodiment, for example, the reference voltage may be zero (0) volts (V) and the driving voltage may have a voltage level within a range of about 7.5 V to about 30 V.

As described above, the control electrode 132 is disposed along the surfaces of the plurality of convex lenses 131a of the lenticular array 131. Thus, the control electrode 132 has a winding shape like the surfaces of the plurality of convex lenses 131a, such that the control electrode 132 includes a plurality of convex portions defined by the profile of the convex lenses 131a. Due to the winding shape of control electrode 132, a distance between the control electrode 132 and the first common electrode 170 varies according to a position of the control electrode 132. The distance between the control electrode 132 and the first common electrode 170 influences the intensity of the electric field between the control electrode 132 and the first common electrode 170. As shown in FIG. 4, the intensity of the electric field is maximized at a first point P1 where the distance between the control electrode 132 and the first common electrode 170 is the shortest. And the intensity of the electric field is minimized at a second point P2 where the distance between the control electrode 132 and the first common electrode 170 is the longest.

Since the intensity of the electric field varies according to the position of the control electrode 132, degree of alignment of the liquid crystal molecules of the first liquid crystal layer 120 may vary according to the position of the control electrode 132. As a result, the liquid crystal molecules are aligned to be substantially perpendicular to the top surface of the middle layer 130 at the point (e.g. the first point P1) where the intensity of the electric field is maximized. Alternatively, the liquid crystal molecules are aligned to be substantially parallel (e.g., horizontal) to the top surface of the middle layer 130 at the point (e.g. the second point P2) where the intensity of the electric filed is minimized. Thus, as shown in FIG. 4, an light transmittance in percent (%) of the first liquid crystal layer 120 in the 3D operation mode is minimized at the first point P1 and is maximized at the second point P2.

As described above, if the intensity of the electric field varies according to a position in the display device 100, the first liquid crystal layer 120 may be aligned in convex lens form.

Referring again to FIG. 3, the pixel part 150 may include a plurality of left-eye-pixels $P_L$ receiving left-eye image data and a plurality of right-eye-pixels $P_R$ receiving right-eye image data. Each of the left-eye-pixels $P_L$ includes three sub-pixels respectively corresponding to the red, green, and blue color-pixels R, G, and B. Each of the right-eye-pixels $P_R$ includes three sub-pixels respectively corresponding to the red, green, and blue color-pixels R, G, and B. The left-eye-pixels $P_L$ and the right-eye-pixels $P_R$ may be alternately arranged in an arrangement direction of the convex lenses 131a, that is, in the left-right direction in FIG. 3.

Additionally, at least one left-eye-pixel $P_L$ and at least one right-eye-pixel $P_R$ collectively may be disposed to correspond to each of the convex lenses 131a and overlaps the respective convex lens 131a in the plan view.

A size S1 of each of the convex lenses 131a satisfies the following mathematical Formula 1.

$$2 \times W1 < S1 < 2 \times n \times W1 \qquad \text{<Formula 1>}$$

Here, "W1" denotes a width of each of the left-eye-pixel $P_L$ and the right-eye-pixel $P_R$, and "n" denotes an integer greater than 1. If the size S1 of each of the convex lenses 131a increases, the number of the left-eye-pixel $P_L$ and the right-eye-pixel $P_R$ which overlap each of the convex lenses 131a may increase. The width of each of the left-eye-pixel $P_L$ and the right-eye-pixel $P_R$, may be defined by outer surfaces of the outermost subpixels in the respective pixel.

Figure 5:
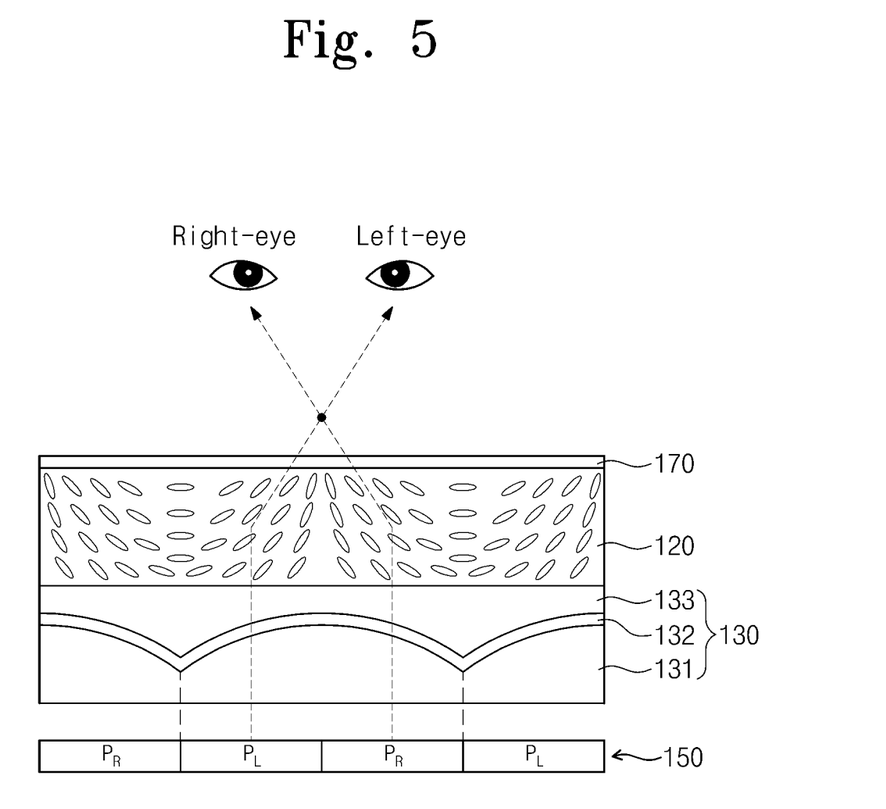
FIG. 5 shows an exemplary embodiment of a method of recognizing a 3D image in a 3D operation mode by a user.

FIG. 5 shows an exemplary embodiment of a method of recognizing a 3D image in a 3D operation mode by a user.

Referring to FIG. 5, in the 3D operation mode, the left-eye-pixel $P_L$ receives the left-eye image data to display an image for a left-eye of the user, and the right-eye-pixel $P_R$ receives the right-eye image data to display an image for a right-eye of the user.

Additionally, the first liquid crystal layer 120 provides the image for the left-eye output from the left-eye-pixel $P_L$ toward the left-eye of an user and provides the image for the right-eye output from the right-eye-pixel $P_R$ toward the right-eye of the user by the electric field formed between the control electrode 132 and the first common electrode 170. Thus, since the user receives the images different from each other through the left-eye and the right-eye, the user stereoscopically recognizes the image output from the image display part 101 using the disparity of the left-eye and the right-eye.

FIGS. 6A to 6G are cross-sectional views showing an exemplary embodiment of a method of manufacturing a middle layer shown in FIG. 3.

Figure 6A:
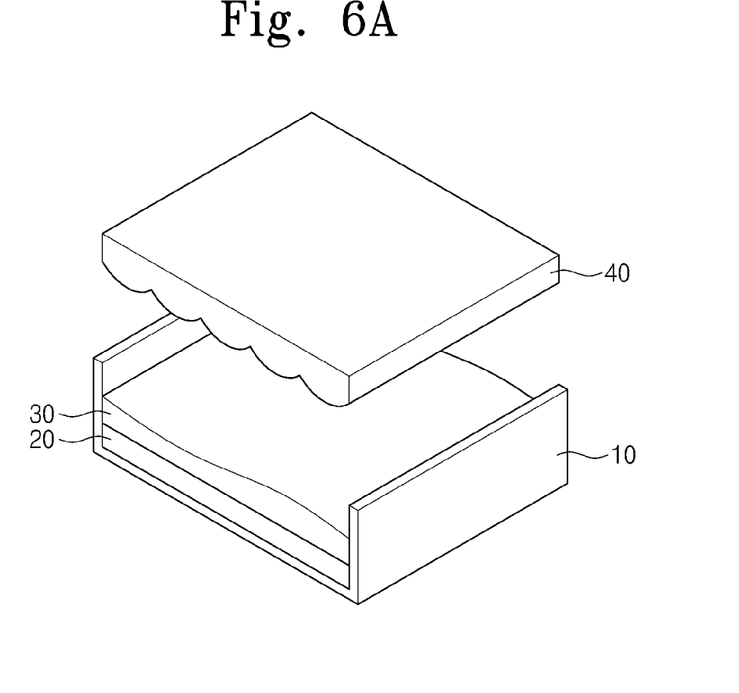
FIGS. 6A to 6G are cross-sectional views showing a method of manufacturing a middle layer shown in FIG. 3.

Referring to FIG. 6A, a glass substrate 20 is disposed in a quadrangle mold 10, and a first light curable polymer layer 30 is formed on the glass substrate 20. A pattern transfer sheet 40 including a plurality of patterned convex lenses-shape disposed on the formed first light curable polymer layer 30. The pattern transfer sheet 40 may include elastomer such as polydimethysiloxane ("PDMS").

Figure 6B:
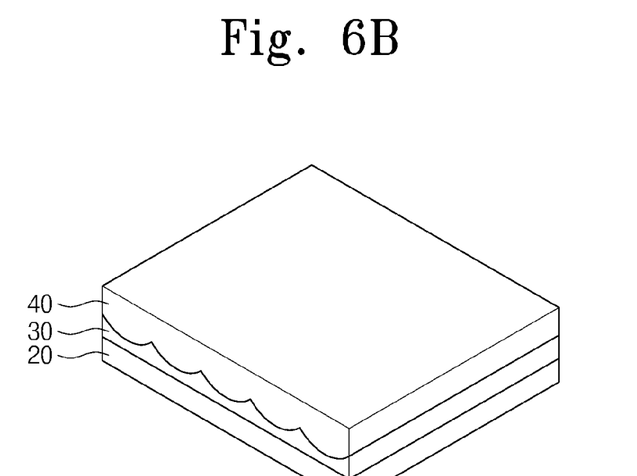

As shown in FIG. 6B, if the pattern transfer sheet 40 is applied with pressure after the pattern transfer sheet 40 is disposed on the first light curable polymer layer 30, the pattern including the plurality of convex lenses form is transferred to the first light curable polymer layer 30. Subsequently, light is irradiated to harden the first light curable polymer layer 30. In an exemplary embodiment, the light may be ultraviolet rays. In one exemplary embodiment, for example, in the hardening process, the ultraviolet rays may have a wavelength band of about 365 nanometers (nm) and the ultraviolet rays may be irradiated with an intensity of about 50 nanowatts per square centimeter ($nW/cm^2$) for about 300 seconds.

Figure 6C:
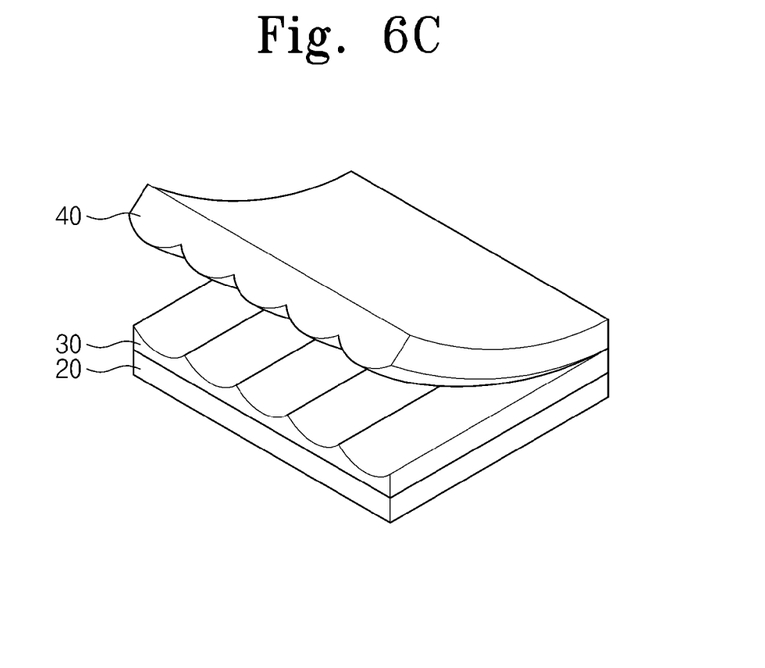
Figure 6D:
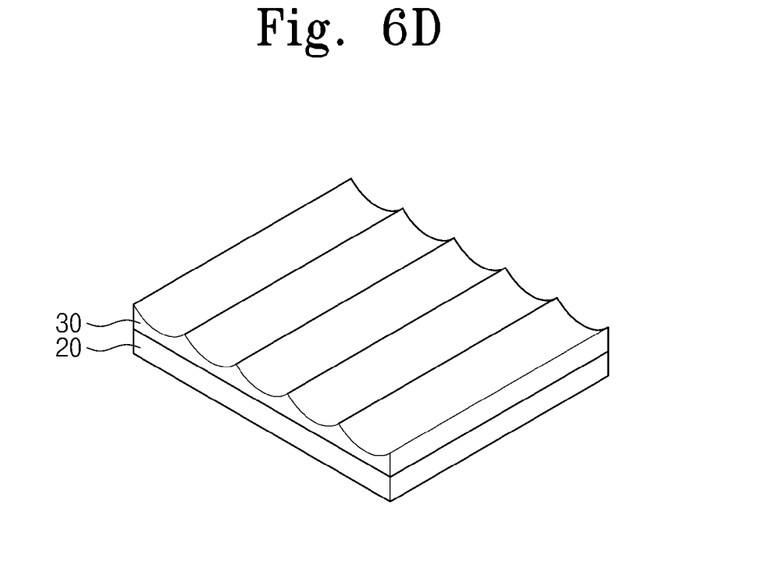

Referring to FIG. 6C, if the first light curable polymer layer 30 is separated from the pattern transfer sheet 40, a structure including a concave lens shape is formed on the first light curable polymer layer 30. The concave lens shape includes a plurality of lenses arranged in a first direction and having a longitudinal axis extended in a second direction which crosses the first direction. Subsequently, referring to FIG. 6D, the first light curable polymer layer 30 may be hardened such as through a thermal treatment process. In an exemplary embodiment, for example, the thermal treatment process may be performed at a temperature of about 100 degrees Celsius for a process time of about 1 hour or more.

Figure 6E:
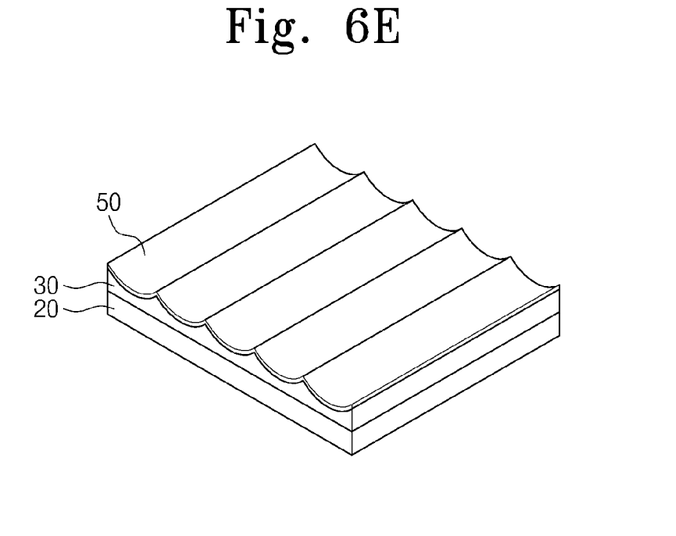

As shown in FIG. 6E, a transparent electrode layer 50 including of ITO is formed on a surface of the first light curable polymer layer 30 including the concave lens shape, such as by a room temperature deposition method. The transparent electrode layer 50 is formed in a substantially uniform thickness on the first light curable polymer layer 30. In an exemplary embodiment, for example, the transfer electrode layer 50 may have a thickness of about 150 nm.

Figure 6F:
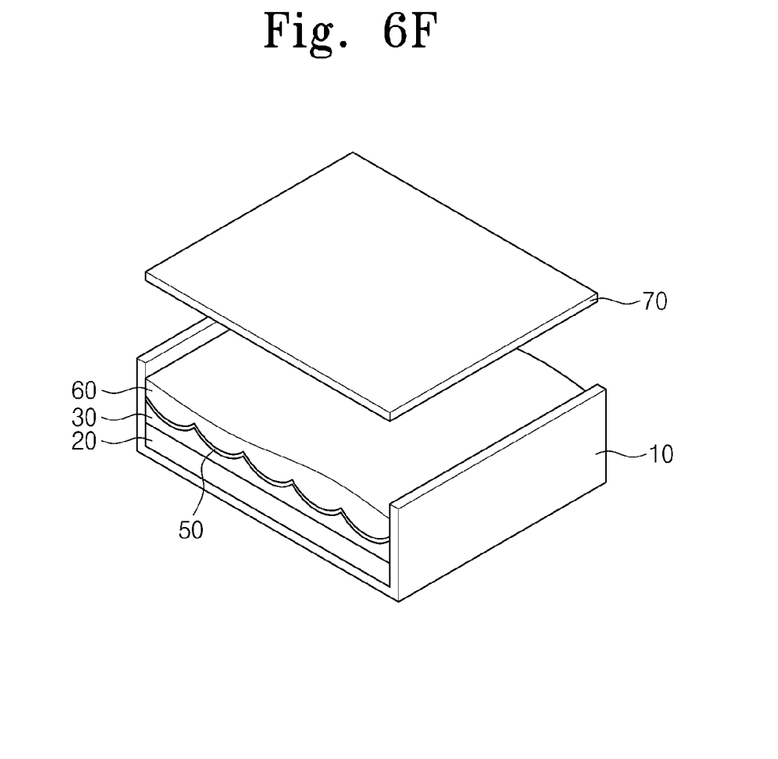

Referring to FIG. 6F, the glass substrate 20 including the first light curable polymer layer 30 and the transparent electrode layer 50 thereon is disposed in the quadrangle mold 10 and then a second light curable polymer layer 60 is formed on the transparent electrode layer 50. Thereafter, a flat plate 70 is disposed on the second light curable polymer layer 60. Pressure is applied to the second light curable polymer layer 60, so that an upper surface of the second light curable polymer layer 60 is flat.

Figure 6G:
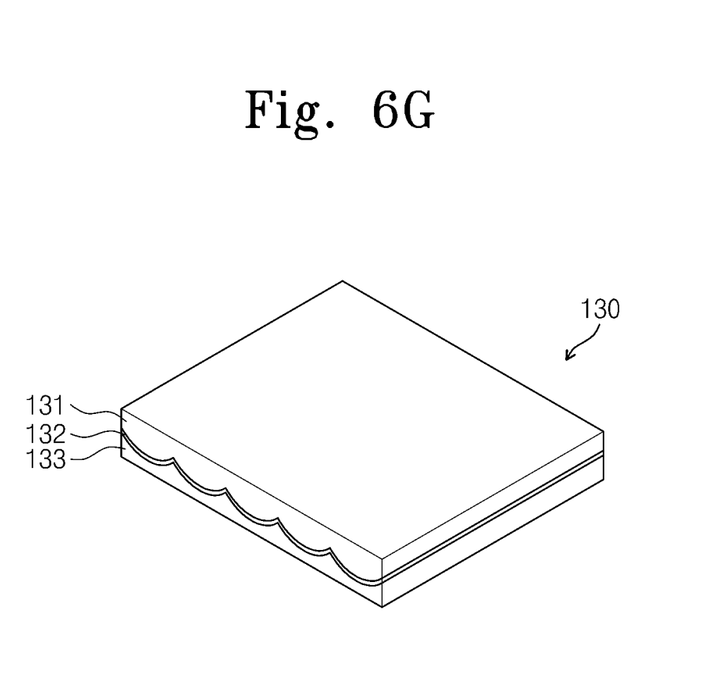

Next, referring to FIG. 6G, the first light curable polymer layer 30, the transparent electrode layer 50 and the second light curable polymer layer 60 are separated from the glass substrate 20, thereby forming the middle layer 130 having a three-layered structure. In other words, the lenticular array 131 of the middle layer 130 is formed of the second light curable polymer layer 60, the control electrode 132 of the middle layer 130 is formed of the transparent electrode layer 50, and the planarization layer 133 of the middle layer 130 is formed of the first light curable polymer layer 30.

Figure 7:
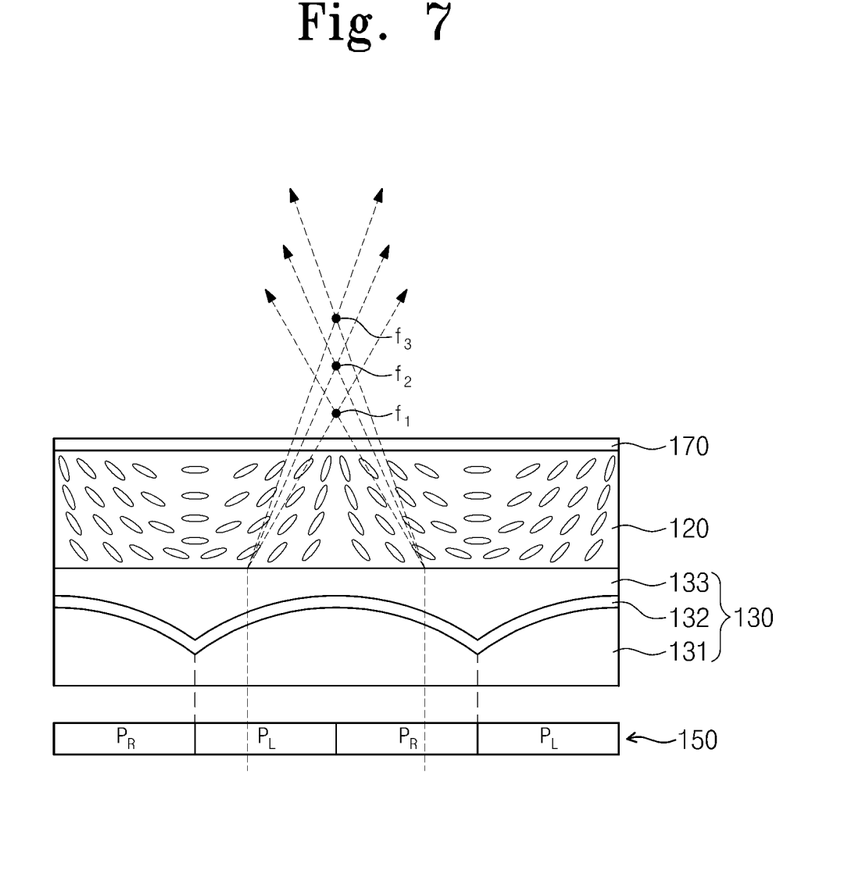
FIG. 7 shows a change of a focal point according to a level of a voltage applied to an exemplary embodiment of a control electrode.
Figure 8:
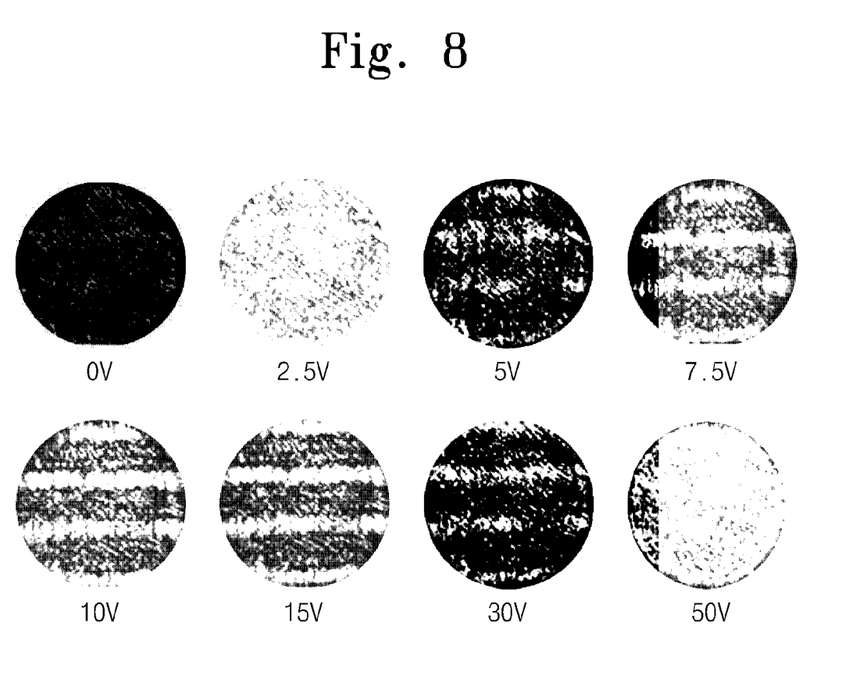
FIG. 8 shows a light transmittance of an exemplary embodiment of a first liquid crystal layer according to a level of a voltage applied to the control electrode shown in FIG. 7.

FIG. 7 shows a change of a focal point according to a voltage level of a voltage applied to an exemplary embodiment of a control electrode, and FIG. 8 shows a light transmittance of an exemplary embodiment of a first liquid crystal layer according to a voltage level of a voltage applied to the control electrode shown in FIG. 7. FIG. 8 shows images obtained by photographing outputs of the 2D/3D converting part according to increasing of the voltage level of the driving voltage applied to the control electrode through a charge-coupled device ("CCD") camera.

Referring to FIGS. 7 and 8, since the first liquid crystal layer 120 includes the normally white mode liquid crystal molecules, if the driving voltage of 0 V is applied to the control electrode 132, the 2D/3D converting part outputs the image of a white state. In an exemplary embodiment, the first common electrode 170 may receive the reference voltage of 0 V.

In the illustrated embodiments, the driving voltages of 2.5 V, 5 V, 7.5 V, 10 V, 15 V, 30 V and 50 V were applied to the control electrode 132 in the order named, in a state that the reference voltage of 0 V was applied to the first common electrode 170, and the outputs of the 2D/3D converting part 102 corresponding to the driving voltages were photographed.

When the driving voltage of 2.5 V was applied to the control electrode 132, the liquid crystal molecules of the first liquid crystal layer 120 minimally responded. However, when the driving voltage of 5 V or more was applied to the control electrode 132, a white portion and a black portion were alternately shown in the outputted image of the 2D/3D converting part 102. When the driving voltage was increased to 7.5 V, 10 V and 15 V in the order named, a focal distance of the first liquid crystal layer 120 arranged in the convex lens form was changed.

As shown in FIG. 7, when the driving voltage of 7.5 V was applied to the control electrode 132, the focal distance of the first liquid crystal layer 120 was defined to "f1." When the driving voltages of 10 V and 15 V were sequentially applied to the control electrode 132, the focal distances of the first liquid crystal layer 120 respectively exhibited "f2" and "f3" greater than the "f1". As a result, the focal distance of the first liquid crystal layer 120 may be controlled according to the voltage level of the driving voltage applied to the control electrode 132.

Additionally, when the driving voltage of 15 V was applied to the control electrode 132, the white portion and the black portion were most clearly distinguished from each other. However, when the driving voltage of 50 V or more was applied to the control electrode 132, all of the liquid crystal molecules were generally vertically aligned, such that the white portion and the black portion were not shown in the outputted image of the 2D/3D converting part 102. That is, the output image from the 2D/3D converting part 102 was shown in the white state.

Thus, when the driving voltage within a range of about 7.5 V to about 15 V is applied to the control electrode 132, the first liquid crystal layer 120 can function as a convex lens. As a result, the 2D/3D converting part 102 can covert images output from the image display part 101 into a 3D image.

According to one or more exemplary embodiments of the invention, the middle layer of a displace device includes the lenticular array and the control electrode is disposed between the first substrate and the second substrate. The lower portion of the display device under the middle layer is defined as the image display part, and the upper portion of the display device above the middle layer is defined as the 2D/3D converting part. Thus, since both of the image display part and the 2D/3D converting part are disposed between only two substrates, an additional substrate is not required in the display device using the lenticular method. As a result, a total thickness of the display device may be reduced.

Additionally, since the number of the substrates decreases, it is possible to prevent or minimize misalignment of the image display part and the 2D/3D converting part.

Furthermore, the planarization layer is added in the middle layer, so that the first liquid crystal layer may have a substantially uniform thickness. As a result, it is possible to prevent or minimize deterioration of a quality of the 2D image in the 2D operation mode.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a middle layer including a lenticular array, and a control electrode on an upper surface of the lenticular array;
   a first substrate including a lower surface facing the upper surface of the lenticular array;
   a first common electrode on the lower surface the first substrate;
   a first liquid crystal layer between the control electrode of the middle layer and the first common electrode;
   a second common electrode on a lower surface of the lenticular array opposite to the upper surface of the lenticular array;
   a second substrate including an upper surface facing the lower surface of the lenticular array;
   a pixel part on the upper surface of the second substrate and including a plurality of pixel electrodes which faces the second common electrode; and
   a second liquid crystal layer between the second common electrode and the pixel part.

2. The display device of claim 1, wherein the middle layer further includes a planarization layer which is between the control electrode and the first liquid crystal layer, covers the control electrode and planarizes an upper surface of the middle layer.

3. The display device of claim 2, wherein the lenticular array includes the same material as the planarization layer.

4. The display device of claim 3, wherein the lenticular array and the planarization layer include light curable polymer.

5. The display device of claim 1, wherein the control electrode includes a transparent conductive material.

6. The display device of claim 1, wherein
   the lenticular array includes a plurality of convex lenses having a longitudinal axis which is extended in a first direction, and
   the plurality of convex lenses is arranged in a second direction perpendicular to the first direction.

7. The display device of claim 6, wherein
   the pixel part further includes left-eye-pixels receiving left-eye data for left-eye displayed images and right-eye-pixels receiving right-eye data for right-eye displayed images, and
   the left-eye-pixels and the right-eye-pixels are alternately arranged in the second direction.

8. The display device of claim 7, wherein
   one left-eye-pixel and one right-eye-pixel together overlap each of the convex lenses of the lenticular array, and
   a size S1 in the second direction of each of the convex lenses satisfies the following Formula, $$2 \times W1 < S1 < 2 \times n \times W1$$

where "W1" denotes a width of each of the one left-eye-pixel and the one right-eye-pixel in the second direction, and "n" denotes an integer greater than 1.

9. The display device of claim 7, wherein
   each of the left-eye-pixels and the right-eye-pixels includes three sub-pixels which are driven independently, and
   the pixel part further includes a color filter layer including a red color-pixel, a green color-pixel and a blue color-pixel respectively corresponding to the three sub-pixels.

10. A method of manufacturing a display device, the method comprising:

forming a middle layer including a lenticular array, and a control electrode on an upper surface of the lenticular array;

forming a first substrate portion including a first substrate of which a lower surface faces the upper surface of the lenticular array, a first common electrode on the lower surface of the first substrate, and a first liquid crystal layer on the first common electrode;

combining the middle layer with the first substrate portion, wherein the first liquid crystal layer is between the control electrode and the first common electrode;

forming a second common electrode on a lower surface of the lenticular array opposite to the upper surface of the lenticular array;

forming a second substrate portion including a second substrate of which an upper surface faces the lower surface of the lenticular array, a pixel part including a plurality of pixel electrodes on the upper surface of theft second substrate, and a second liquid crystal layer on the pixel part;

combining the middle layer with the second substrate portion, wherein the second liquid crystal layer is between the second common electrode and the pixel part.

11. The method of claim 10, wherein the forming the middle layer comprises disposing a further planarization layer between the control electrode and the first liquid crystal layer, and covering the control electrode, wherein the planarization layer planarizes an upper surface of the middle layer.

12. The method of claim 10, wherein the forming the middle layer comprises:

forming a first light curable polymer layer in a prepared mold;

disposing a pattern transfer sheet having a plurality of convex lenses-shape, on the first light curable polymer layer;

applying pressure to the pattern transfer sheet and forming a plurality of concave lenses-shape on the first light curable polymer layer;

irradiating light to the first light curable polymer layer including the plurality of concave lenses-shape, to harden the first light curable polymer layer;

separating the pattern transfer sheet from the first light curable polymer layer including the plurality of concave lenses-shape;

depositing a transparent conductive material on the first light curable polymer layer including the plurality of concave lenses-shape, to form a transparent electrode layer;

forming a second light curable polymer layer on the transparent electrode layer; and flattening a top surface of the second light curable polymer layer.

13. The method of claim 12, wherein the pattern transfer sheet includes elastomer.

14. The method of claim 10, wherein the lenticular array of the middle layer includes a plurality of convex lenses having a longitudinal axis which is extended in a first direction, and the plurality of convex lenses is arranged in a second direction perpendicular to the first direction.

15. The method of claim 14, wherein the pixel part further includes left-eye-pixels receiving left-eye data for left-eye displayed images and right-eye-pixels receiving right-eye data for right-eye displayed images, and the left-eye-pixels and the right-eye-pixels are alternately arranged in the second direction.

16. The method of claim 15, wherein one of the left-eye-pixels and one of the right-eye-pixels together overlap each of the convex lenses, and a size S1 in the second direction of each of the convex lenses satisfies the following Formula, $$2 \times W1 < S1 < 2 \times n \times W1$$

where "W1" denotes a width of each of the one left-eye-pixel and the one right-eye-pixel in the second direction, and "n" denotes an integer greater than 1.

17. The method of claim 15, wherein each of the left-eye-pixels and the right-eye-pixels includes three sub-pixels which are driven independently, and the pixel part further includes a color filter layer including a red color-pixel, a green color-pixel and a blue color-pixel respectively corresponding to the three sub-pixels.

18. The display device of claim 1, further comprising a backlight unit which opposes the first substrate with respect to the second substrate, wherein the backlight unit generates light and provides the light to the second substrate.

19. The display device of claim 1, wherein the second common electrode contacts the middle layer.

* * * * *